United States Patent [19]

Lynn

[11] 4,260,309
[45] Apr. 7, 1981

[54] PALLETIZER
[75] Inventor: William F. Lynn, Taylor, Mich.
[73] Assignee: Precision Pneumatic Palletizer, Inc., Detroit, Mich.
[21] Appl. No.: 67,854
[22] Filed: Aug. 20, 1979
[51] Int. Cl.³ ............................................. B65G 57/24
[52] U.S. Cl. .................................... 414/46; 414/82; 414/98; 414/101; 414/131
[58] Field of Search ........................ 414/46, 82, 85, 98, 414/100, 101, 131

[56] References Cited
U.S. PATENT DOCUMENTS

| 2,875,907 | 3/1959 | Locke et al. | 414/85 X |
| 3,137,286 | 6/1964 | Raynor | 414/98 X |
| 3,164,080 | 1/1965 | Miller | 414/82 X |
| 3,381,828 | 5/1968 | Sheehan | 414/101 X |
| 3,612,300 | 10/1971 | Berghgracht | 414/101 X |
| 3,624,782 | 11/1971 | McReek et al. | 414/100 X |
| 3,669,282 | 6/1972 | Carlson | 414/82 X |
| 3,718,267 | 2/1973 | Hiebert et al. | 414/101 X |
| 3,941,048 | 3/1976 | Oe et al. | 414/82 X |
| 4,030,618 | 6/1977 | Kelley et al. | 414/101 X |

FOREIGN PATENT DOCUMENTS

2558556  7/1976  Fed. Rep. of Germany ............. 414/82

Primary Examiner—Leslie J. Paperner
Attorney, Agent, or Firm—Cullen, Sloman, Cantor, Grauer, Scott & Rutherford

[57] ABSTRACT

The palletizer or machine is provided to load parcels layer by layer onto a pallet carried by an elevator. The machine includes a small frame housing the elevator and an elevated platen which is mounted above the elevator on which the parcels are manually arranged into desired patterns by an operator standing adjacent the platen. After a layer of parcels has been assembled on the platen, the platen is retracted to drop the layer onto the pallet or preceding layer. The elevator supports the pallet or preceding layer at a level immediately below the platen. The palletizer includes a subframe in which the pallet storage station is located, with the subframe adapted to be secured to either left hand side or to the right hand side of the main frame. The subframe includes or carries a power feed mechanism including a ram. When the desired number of layers are accumulated on the pallet, the ram is energized and abuts an empty pallet in the pallet storage station of the subframe and moves it onto the elevator and simultaneously the empty pallet engages the loaded pallet and discharges same from the palletizer.

11 Claims, 18 Drawing Figures

FIG—1

PALLETIZER

BACKGROUND OF THE INVENTION

The present invention relates generally to palletizers and more particularly to a novel and improved semi-automatic palletizer including a frame and a subframe containing the pallet storage section which is adapted to be mounted on either the left hand side or the right hand side of the main frame so as to suit various space and loading requirements. With such a construction, an operator may arrange layers of parcels on the platen and to sequentially position such layers on a pallet carried by the elevator located within the main frame.

It is well known that materials such as bags or parcels are stacked on pallets or platforms to improve handling efficiency. Used with lift trucks, such pallets after being loaded, may be easily moved to storage locations or to a truck carrier for shipping. Palletizer machines are provided to eliminate human effort which would otherwise be required to lift and arrange parcels or bags on the pallets. At the same time, while reducing human effort, the palletizer frequently speeds up pallet loading operations in many instances.

PRIOR ART

Highly automated, high-volume palletizers are now in use. Such machines have been developed with automatic sequence control to automatically feed and arrange parcels into layers. Layers are successively stacked on pallets which are also automatically fed into and discharged from the palletizers. As a consequence of the degree of automation, these machines have been relatively complex and expensive. Moreover, the degree of complexity often found in these machines requires highly qualified operators and technicians to maintain them. Further such machines are not suited for various space limitations which may require the pallet storage section of the machine to be located on the right hand side of the machine rather than the left hand side.

The prior art discloses various semi-automatic palletizers. As an example, U.S. Pat. No. 3,624,782 of Orlin A. McPeek, dated Nov. 30, 1971 discloses a semi-automatic palletizer which permits an operator to progressively arrange layers of articles on an arranging table or platen and to sequentially position such layers on a pallet. U.S. Pat. No. 4,030,618 of Norman S. Kelley et al, dated June 21, 1977, discloses a semi-automatic palletizer which includes a power feed mechanism to automatically position empty pallets on the elevator and for ejecting loaded pallets from the elevator. In such a construction, the feed mechanism includes a fork-type lift which is extended into the pallet, adjacent to the bottommost pallet of the pallet supply position, and which thereafter raises such pallet and all pallets above, clear of the bottom pallet at the supply position. A pusher pushes an empty pallet from the supply position onto the elevator and causes removal of a loaded pallet as the empty pallet is supplied.

The prior art further discloses palletizing systems to automatically feed pallets to a loading station from a stack of pallets. Such systems are disclosed, as an example, in U.S. Pat. No. 3,101,852, dated Aug. 27, 1963 and U.S. Pat. No. 3,159,896, dated Dec. 8, 1964. In such patents, the pallet feed mechanism is arranged to permit the feeding of a bottom pallet from a stack of empty pallets.

Other prior art patents showing the general state of the art includes the following U.S. Pat. Nos.: 2,633,251 dated Mar. 31, 1953; Bruce et al, 2,699,264 dated Jan. 11, 1955; Broberg et al, 2,703,182 dated Mar. 1, 1955; Hynson, 2,780,340, dated Feb. 5, 1957; Miller, 2,813,638 dated Nov. 19, 1957; Raynor, 2,946,465 dated July 26, 1960; Fenton, 2,947,405 dated Aug. 2, 1960; Currie, 2,966,018, dated Dec. 27, 1960; Raynor, 3,137,286, dated June 16, 1964; Bolt, 3,142,389, dated July 28, 1964; Bolt, 3,157,294, dated Nov. 17, 1964; Poindexter et al, 3,161,302, dated Dec. 15, 1964; Sheehan, 3,381,828, dated May 7, 1968; Berghgracht, 3,612,300, dated Oct. 12, 1971; Carlson, 3,669,282 dated June 13, 1972; Kurk et al, 3,700,127, dated Oct. 24, 1972; Alduk, 3,833,132, dated Sept. 3, 1974; and Pulda, 4,068,765, dated Jan. 17, 1978.

SUMMARY OF THE PRESENT INVENTION

The palletizer contains a main frame in which is provided the elevator or a vertical lift and an elevated platen which is movable horizontally to an extended position directly above the elevator where it receives a layer of parcels and from where it is movable to a retracted position at one side of the elevator whereby the layer of parcels falls onto the elevator supported pallet or onto a layer of parcels carried thereby. The invention is characterized by the provision of a subframe containing the pallet storage station or section which is adapted to be located on either the left hand side or the right hand side of the main frame depending on floor space limitations and other factors having to do with the position of the conveyor or parcel feed mechanism which directs the parcels to the elevated platen.

The invention is further characterized by the provision of an improved mechanism to automatically supply and position pallets for loading in the elevator whereby a power operated ram engages and pushes the empty bottom pallet in the pallet storage station of the subframe through a slot or opening in the dividing wall between the frame and subframe into the elevator section of the main frame whereby the empty pallet engages the loaded pallet and pushes it out of the pallet loading station onto a discharge conveyor or roller conveyor for subsequent engagement, as an example, by a fork lift truck. Simultaneously, the unloaded pallet replaces the loaded pallet on the elevator.

The parcel loading section or station includes the elevator. The empty pallet is positioned by the power operated ram on the elevator in a lowered position. Thereafter the elevator is moved vertically upwardly to position the empty pallet immediately below the platen which is movable in a horizontal path generally perpendicular to the path of movement of the elevator. As the layers of parcels or bags are sequentially transferred from the platen to the pallet, the elevator lowers to thereby position the top layer of parcels resting on the pallet, immediately below the platen. When the pallet on the elevator is fully loaded, the elevator returns to its initial lower position and the loaded pallet is replaced by an unloaded pallet.

The reversible subframe, which can be mounted on either side of the main frame, carries a cylinder device containing a ram which is adapted to engage one side of an empty pallet, with the other side of the pallet adapted to engage the loaded pallet and move the loaded pallet off the elevator onto a suitable conveyor, or roller mechanism and at the same time move the empty pallet onto the elevator at the loading station. To permit easy movement of the loaded pallet off the elevator, the elevator is provided with support rollers for the pallet.

Thus, it is a feature of the present invention to provide a semi-automatic pallet loading machine or palletizer which receives parcels from a conveyor, with the parcels being removed by an operator standing on a raised operator stand forming part of the palletizer. The parcels are individually manually arranged on the movable platen as they are received at the loading station from the conveyor. When enough parcels have been arranged into a desired pattern or layer, the operator presses a control button to retract the platen. As the platen retracts or moves to a non-extended position, the arranged layer of parcels drops onto the pallet or onto a preceding layer or layers on the pallet supported by the elevator. When the platen is fully retracted, the elevator supporting the pallet automatically descends. When the top layer has descended sufficiently, a photocell circuit is energized to automatically stop the elevator and return the platen to an extended position directly above the pallet and the elevator. After the appropriate number of layers have been placed on the pallet, the operator pushes another control button to energize the power operated ram which inserts an unloaded pallet into the elevator station and simultaneously the unloaded pallet ejects the loaded pallet from the machine or apparatus.

A further feature of the present invention is to provide a palletizer which reduces the physical effort required of the operator since no lifting of parcels by the operator is required and only a minimum physical effort is required to manipulate the controls provided adjacent the operator station. Only a limited number of manual controls are provided to load a pallet and discharge it from the machine.

Another feature of the present invention is to provide a palletizer which utilizes relatively simple mechanical components and control elements including valves and cylinders which require correspondingly limited operator skill and machine maintenance.

Still another feature of the present invention is to provide a semi-automatic palletizer of great versatility and flexibility as to size and shape of the containers or bags or cartons being loaded on pallets as well as flexibility and variety in the building of stacking patterns.

A further feature of the present invention is to provide a semi-automatic palletizer which includes means at the parcel loading station of adjusting the length and width of the layer and of stripping the parcels from the loading station at the time the plate is retracted.

A still further feature of the present invention is to provide a palletizer adapted for handling units or parcels of various sizes, dimensions, and character and for the stacking of such parcels upon a pallet in any number of predetermined tiers or layers.

Another feature of the present invention is to provide a palletizer incorporating unique control means whereby the various requisite operations will be effected in a reliable and rapid manner.

Still another feature of the present invention is to provide a palletizer or machine which comprises a compact and fully integrated structure, so that it may be easily transported from one location to another and used depending on the floor space available for either loading the empty pallets from either the left hand side or the right hand side of the main frame.

Still a further feature of the present invention is to provide a palletizer having simplicity of design, which is economical in installation, operation and maintenance, which may be easily incorporated in any existing assembly line or warehousing operation, which may be utilized in various ways depending on the space available, and which, when in use, does not generally require experienced operators and labor.

BRIEF DESCRIPTION OF THE DRAWINGS

FIG. 8 is a fragmentary view of the elevator lift mechanism taken on the line 8—8 of FIG. 3;

DESCRIPTION OF A PREFERRED EMBODIMENT

Figure 2:
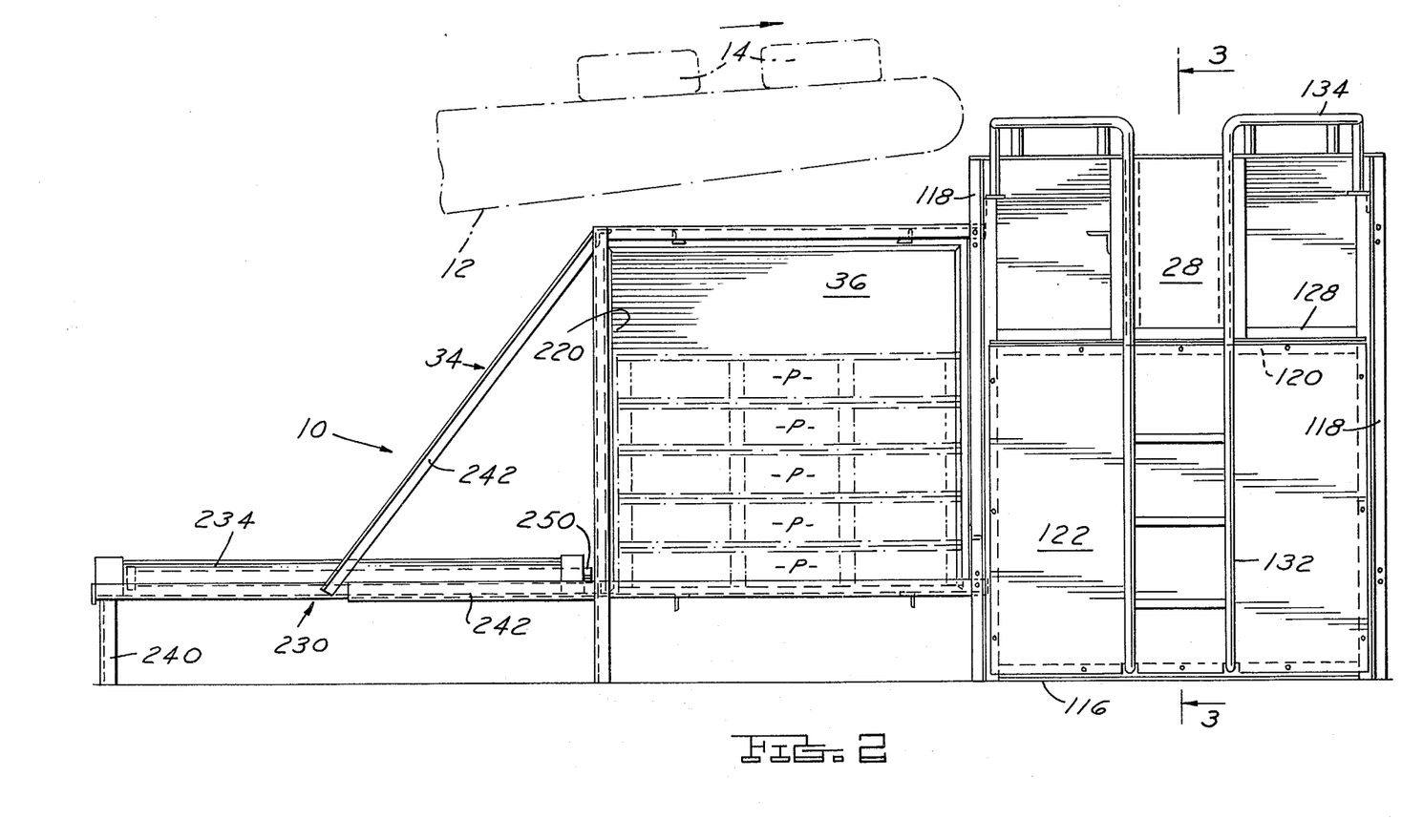
FIG. 2 is a front elevational view of the palletizer looking in the direction of arrows 2—2 of FIG. 1.
Figure 16:
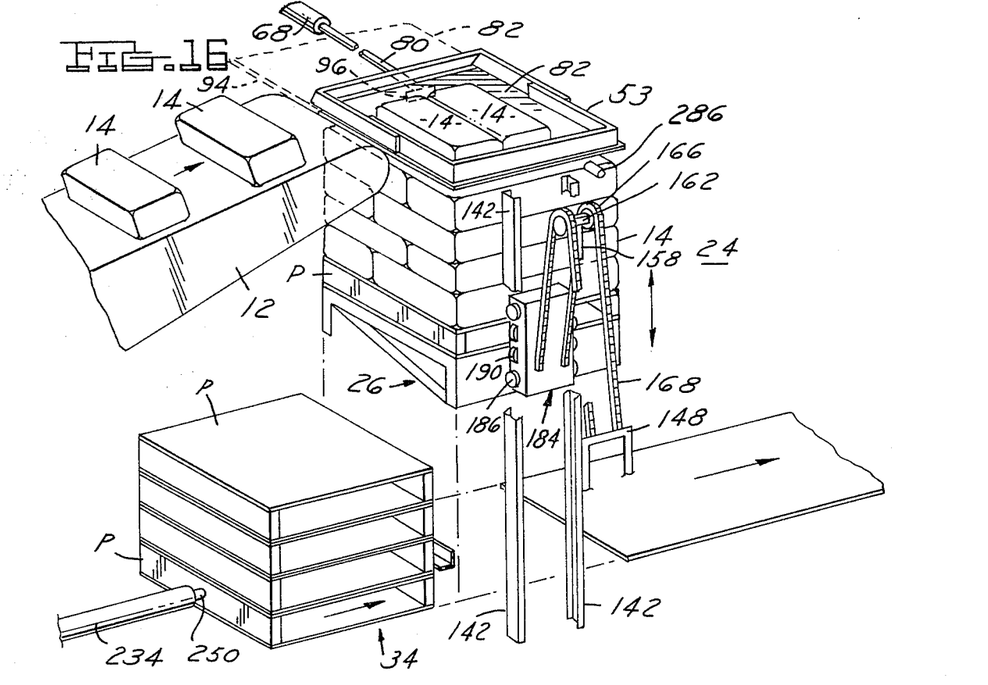
FIG. 16 is a perspective view illustrating the loading of parcels from a conveyor onto the movable slide or platen and the subsequent withdrawal of the platen and the dropping of the parcels upon the adjacent layers of parcels.
Figure 17:
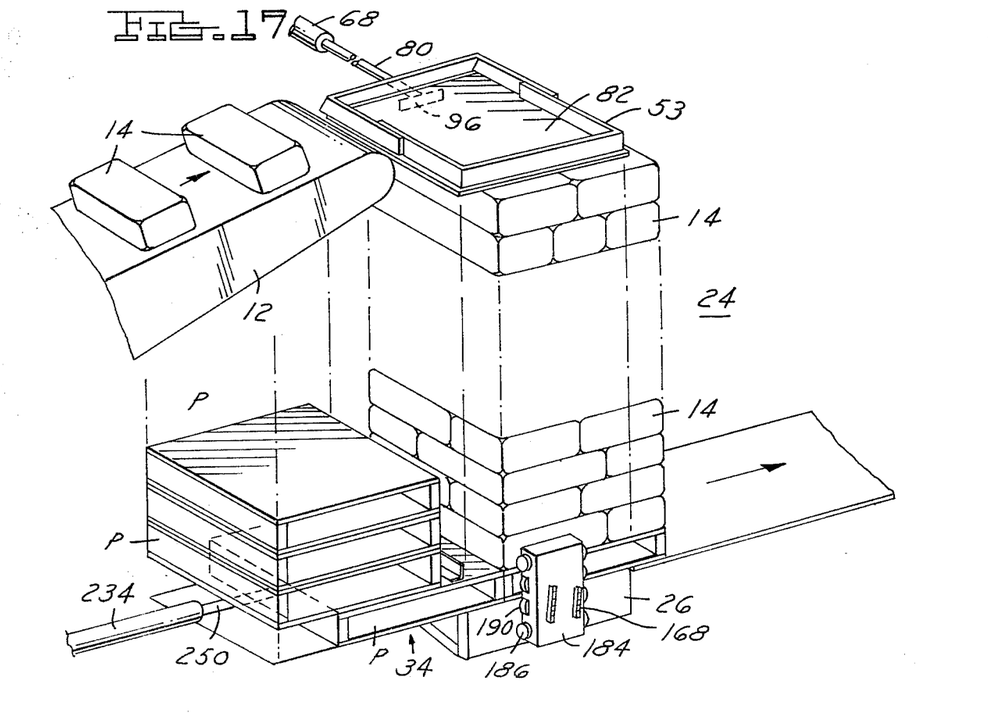
FIG. 17 is a perspective view illustrating the insertion of the lowermost pallet from the pallet storage section of the subframe into the elevator section of the palletizer by means of a ram and the removal of the loaded pallet from the elevator section by the newly injected pallet.

A palletizer 10, forming the present invention, is utilized in conjunction with a parcel feed mechanism 12 such as a conveyor as shown diagrammatically in FIGS. 2, 16 and 17. Parcels 14, shown as bags, are conveyed by the parcel feed mechanism 12 from a loading station, not shown, where the bags or parcels 14 are filled, as an example, with a granular substance such as fly ash. After the bags 14 are filled, they are closed and sealed and are thereafter placed on and transported by the parcel feed mechanism 12 to the palletizer 10 as shown in FIGS. 2, 16 and 17.

Figure 1:
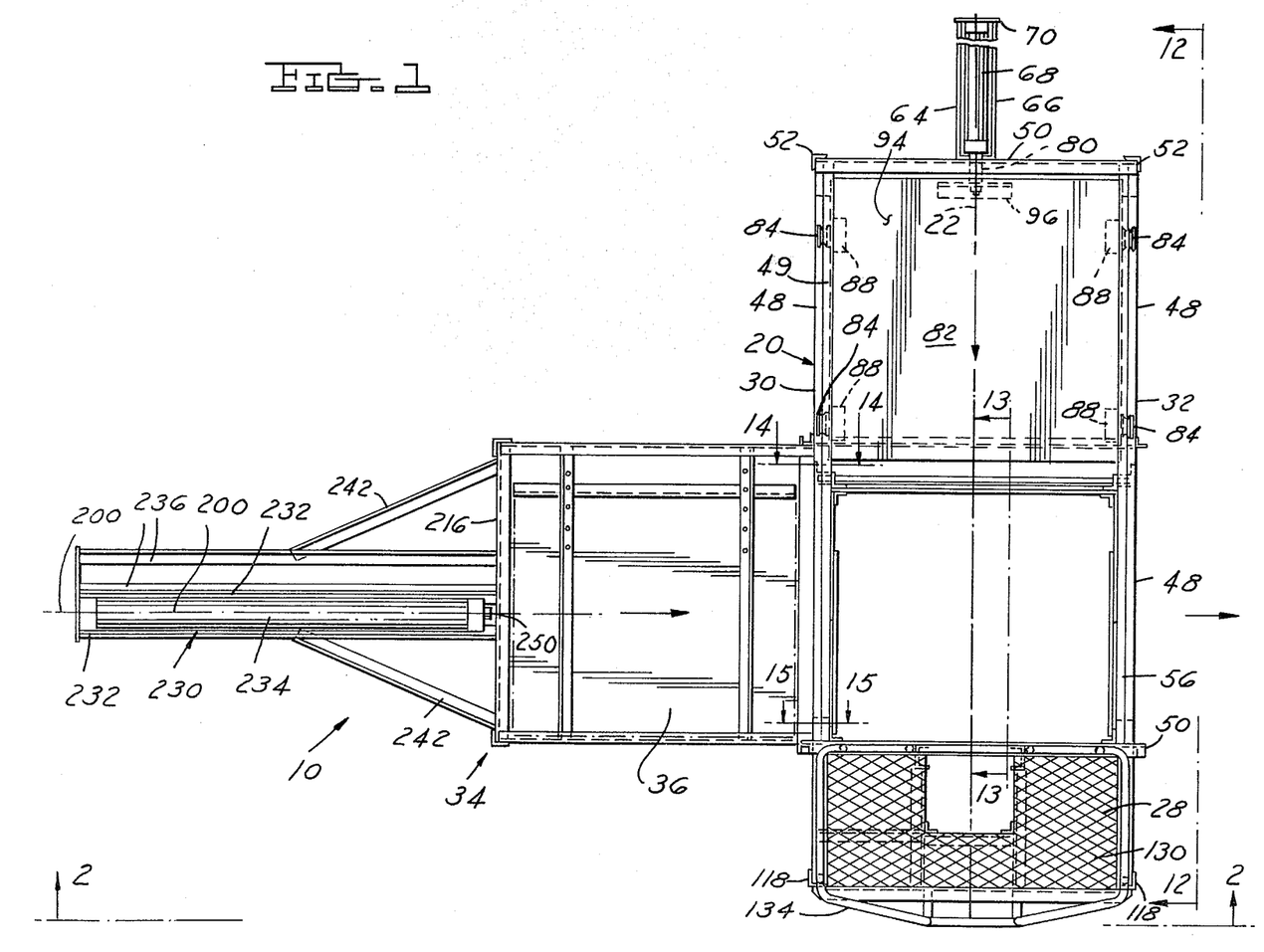
FIG. 1 is a plan view of the palletizer, with the reversible subframe containing the pallet storage station located on the left hand side.

The palletizer 10 is designed primarily for semi-automatic operation and includes a main frame 20 of generally rectangular configuration in plan as shown in FIG. 1. The frame 20 has a longitudinal axis 22. The main frame 20 houses or supports an elevated parcel loading station 24 located above a vertically movable elevator or lift mechanism 26 (FIG. 12) and an operator station 28 for supporting the operator who removes the parcels 14 from the parcel feed mechanism 12 and places them on a platen at the parcel loading station 24 as will subsequently be described.

The main frame 20 has a left hand side 30 and a right hand side 32 as noted in FIG. 1. The palletizer 10 includes a subframe 34 which contains the pallet storage section or station 36. The pallet storage section 36 including the subframe 34 may be secured to the left hand side 30 of the main frame 20 as shown in FIGS. 1 and 2 or may be secured to the right hand side 32 of the main frame 20 as will subsequently be described in the event the available floor space requires the subframe to be located on the right of the main frame 20.

The main frame 20 consists of a floor engaging base 40 (FIG. 12) of generally rectangular configuration formed by a series of horizontally extending structural members 42 paralleling the axis 22 and another series of horizontally extending structural members 44 perpendicular to and intersecting members 42; an elevated track support 46 of generally rectangular configuration formed by a series of generally horizontally extending structural members 48 paralleling the axis 22 and another series of horizontally extending structural members 50 perpendicular to and intersecting members 48; and vertically extending structural corner posts or elements 52 connected at the lower and upper opposite ends thereof to the floor base 40 and to the elevated track support 46 respectively. The structural members are of angle right angle shape cross section.

Figures 13, 14:
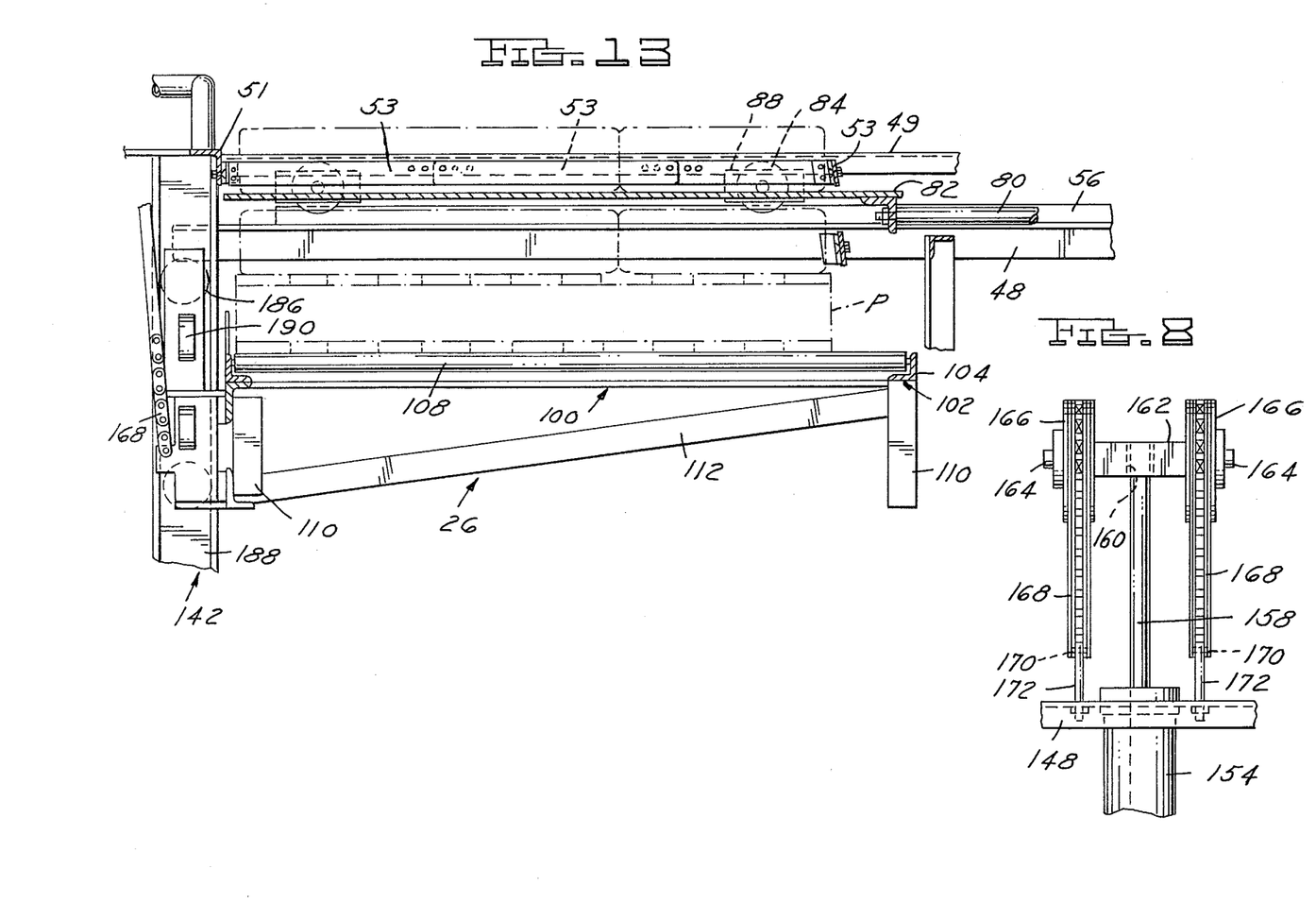
FIG. 13 is a fragmentary sectional view through the elevator zone of the palletizer, looking in the direction of arrows 13—13 of FIG. 1.
FIG. 14 is a fragmentary sectional view through the track support structure, looking in the direction of arrows 14—14 of FIG. 1.
Figure 14:
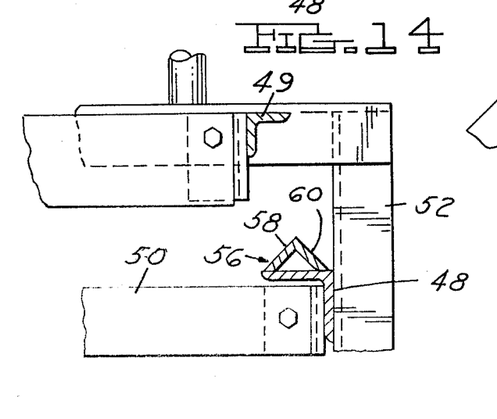
Figure 15:
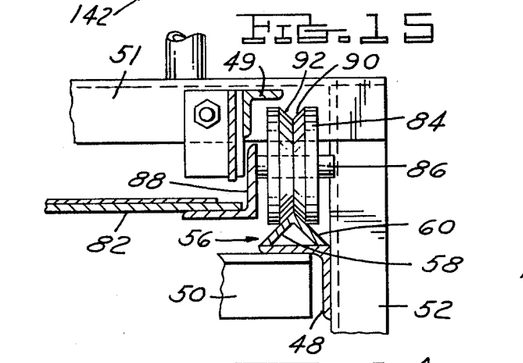
FIG. 15 is a fragmentary sectional view illustrating in part the slide, rollers and track support structure and looking in the direction of arrows 15—15 of FIG. 1.

The corner posts 52 extend upwardly above the track support 46 and carry a pair of parallel angle shaped members 49 which are above members 48 and are parallel to axis 22. The members 49 adjacent the operator station 28 are connected by an angle shaped member 51 (FIGS. 13 and 15). Members 49 and 51 are each provided with a row of bolt openings (FIG. 13) for permitting adjustable frame members 53 (FIGS. 1, 13, 16 and 17), arranged in the form of a rectangle to be connected thereto. The length and width of the frame formed by adjustable members 53 may be changed or varied depending upon the size of the parcels or bags. The adjustable frame overlies the parcel loading station 24. The frame members 53 are arranged to permit the platen 82 to be moved underneath to thereafter permit the parcels 14 to be arranged thereon.

Figure 12:
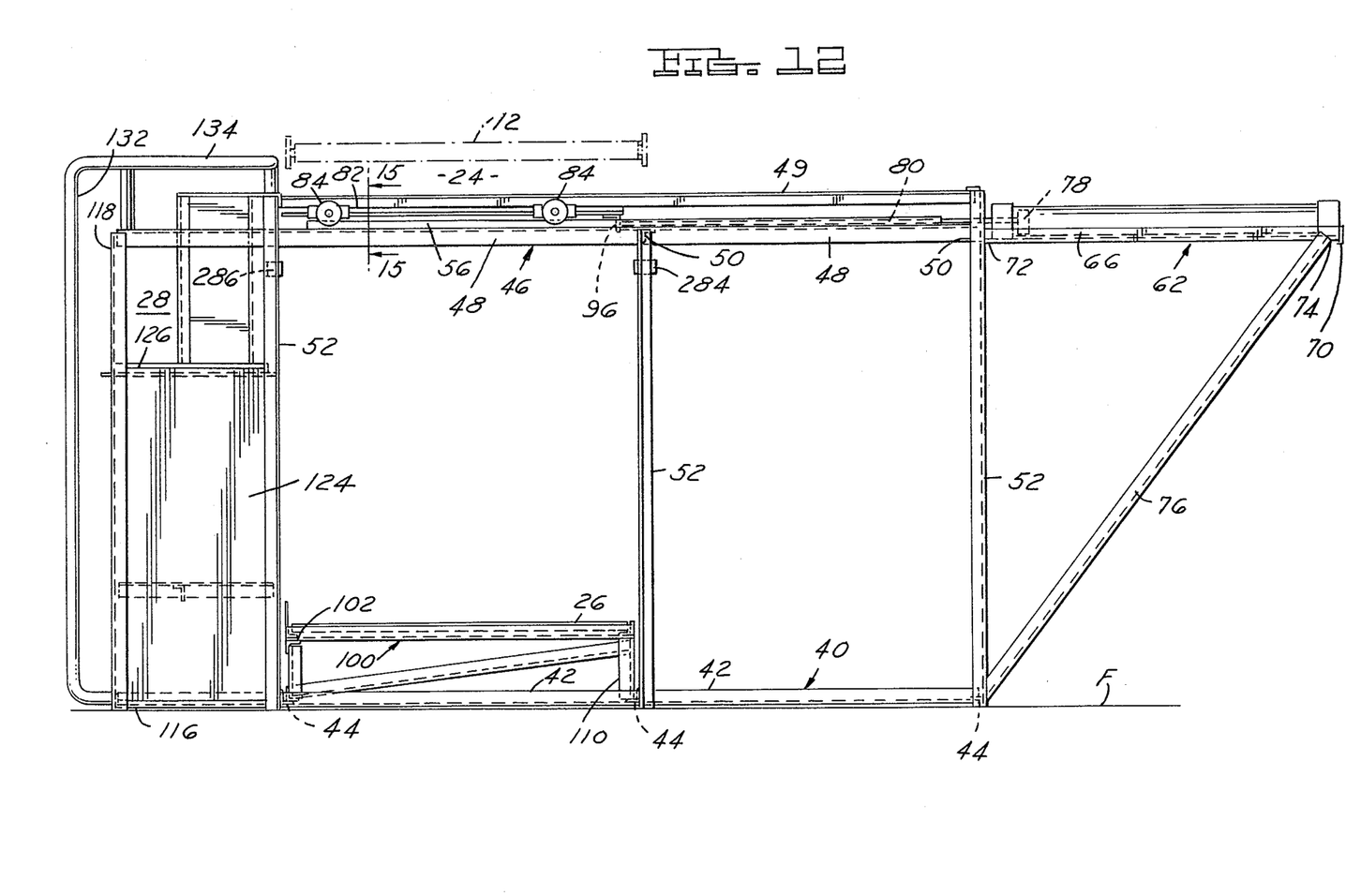
FIG. 12 is a right hand end view of the palletizer looking in the direction of arrows 12—12 of FIG. 1.

Mounted on the elevated track support 46 are a pair of elongated tracks 56 on opposite sides of the longitudinal axis 22. The tracks 56 extend from one end of the elevated track support 46 to the other end. Each track 56 is in the form of an elongated structural right angle member having a pair of intersecting flanges 58 and 60, with the intersection thereof pointing upwardly as noted in FIGS. 14 and 15. The main frame 20 further includes an upper cylinder support 62 consisting of a pair of elongated angle members 64, 66 spaced apart along axis 22 (FIG. 1) to form a saddle for the air cylinder 68. The outer ends of members 64, 66 are closed by plate 70 (FIGS. 1 and 12). The inner end 72 of the cylinder support 62 is appropriately secured by bolting, welding or otherwise to the upper track support 46. The outer end 74 of the cylinder support 62 is supported by a pair of elongated angle braces or struts 76, as shown in FIG. 12, which are connected on the lower ends to the base 40 of the main frame 20. The cylinder 68 contains the usual piston 78 and rod 80.

A sliding table or platen 82 in the form of a flat plate, of generally rectangular configuration, is provided for movement on the elevated track structure 46 along the axis 22. The platen 82 includes at the forward and rear ends thereof wheels 84 on opposite sides of the platen 82. The wheels 84 are each mounted on an axle 86 carried by a bracket 88 welded or otherwise secured to the table 82 as best noted in FIG. 15. Thus the platen 82 has two front wheels 84 and two back wheels 84. The wheels 84 are spaced laterally outwardly from the edges of the platen 82 as best illustrated in FIGS. 1 and 15. Each wheel 84 has a centrally located generally tapered annular groove 90 which presents side surfaces 92 for engaging the opposite or opposing flanges 58, 60 of the track 50 as noted in FIG. 15. The rearward end 94 of the sliding platen 82 is provided with a centrally located bracket 96. The outer end of the piston rod 80 is adjustably and threadedly secured to the bracket 96 as shown in FIG. 1.

Energization of the air cylinder 68 is effective to reciprocate the piston 78 and thus the piston rod 80 to thereby correspondingly move the sliding table or platen 82 from the back or retracted position shown in FIG. 1 to a forward or extended position where the platen 82 overlies the parcel loading station 24 and elevator 26. In the extended position, the platen 82 is located beneath the adjustable frame members 53 as shown in FIGS. 13, 16 and 17 whereby the parcels 14 may be placed on the platen 82 in a pattern determined by the frame members 53.

The elevator 26 has a generally rectangular roller support 100 consisting of four elongated right angle members 102, each member 102 having one flange thereof horizontal and the other flange thereof vertical. A pair of opposing vertical flanges 104 (FIG. 3) are provided with a series of corresponding openings for receiving the shaft or bearing portions 106 of a series of rollers 108 of the type indicated in FIG. 4. The axes of the rollers 108 are parallel to the axis 22. The rollers 108 provide a support for a pallet P as will subsequently appear. The roller support 100 has a plurality of vertical legs 110 at the forward edge and at the rear edge thereof, with the legs 110 connected by appropriate side cross braces 112 to provide adequate support for the elevator 26 when it is loaded and its legs 110 rest upon the floor F.

The main frame 20 further provides for the operator's station 28 (FIGS. 1, 2 and 3) where the various control mechanisms are provided for operating the palletizer 10 as will subsequently be explained.

Figure 4:
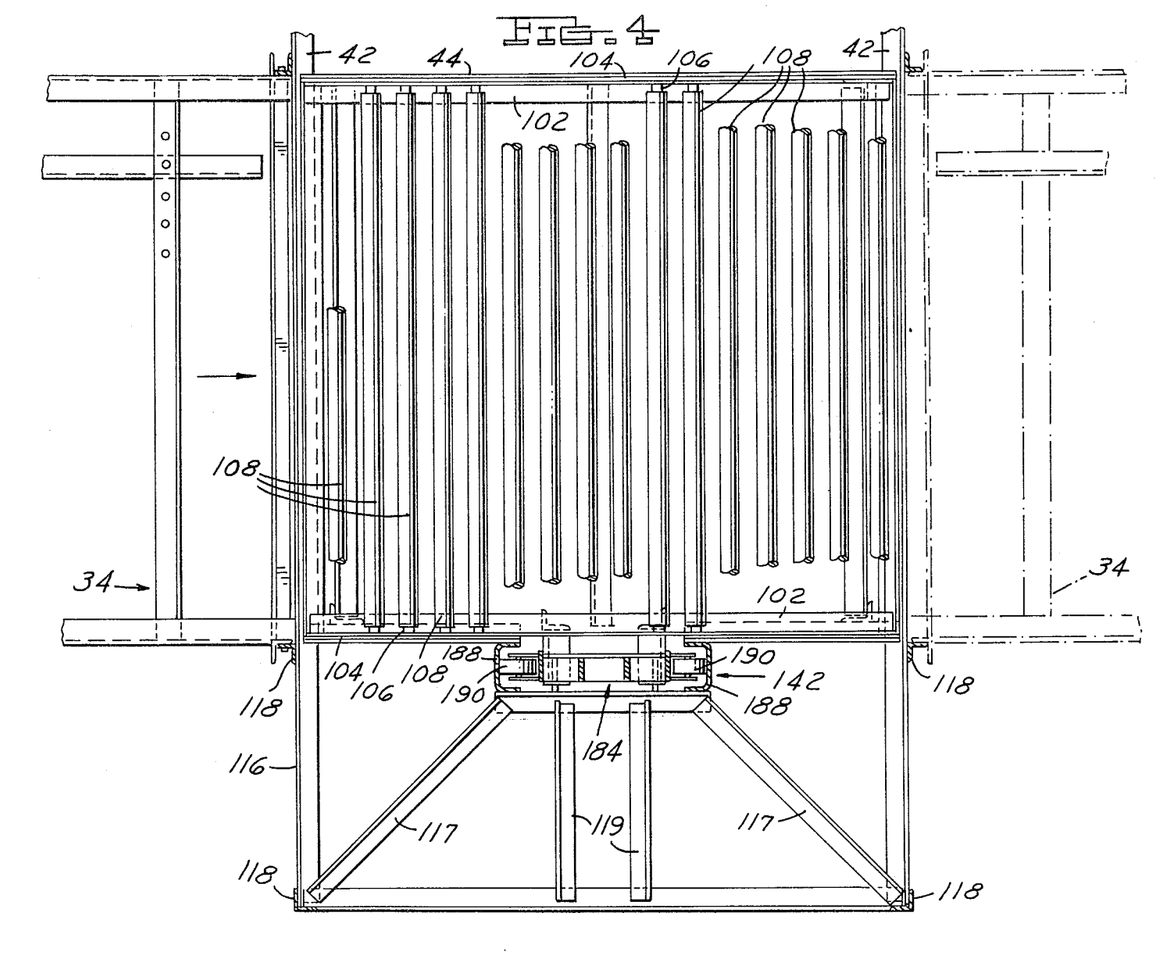
FIG. 4 is a plan view of the elevator and lift mechanism of the palletizer, partly in section, looking in the direction of arrows 4—4 of FIG. 3.
Figure 5:
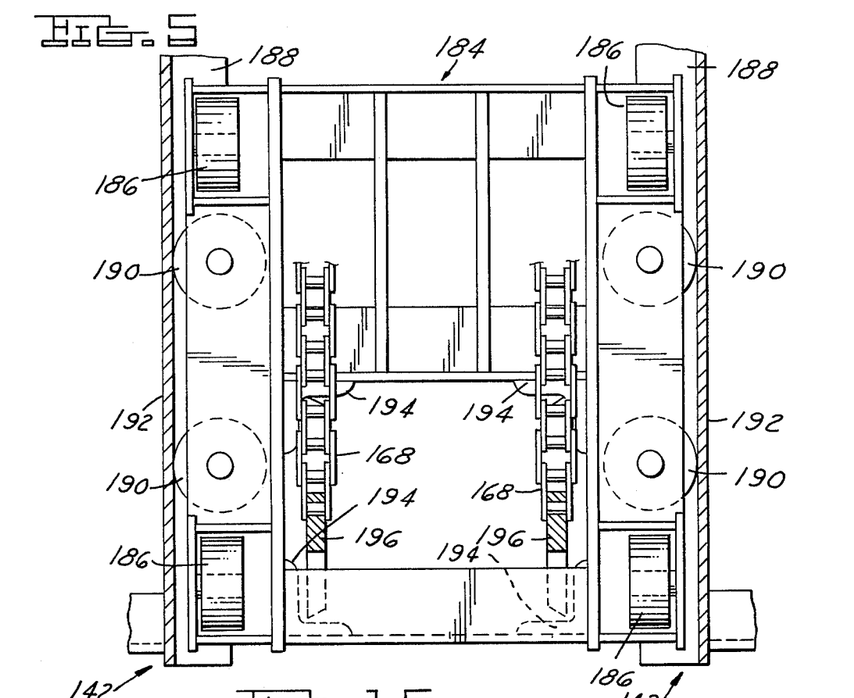
FIG. 5 is a fragmentary elevational view of the carriage assembly of the elevator lift mechanism looking in the direction of arrows 5—5 of FIG. 3.
Figure 6:
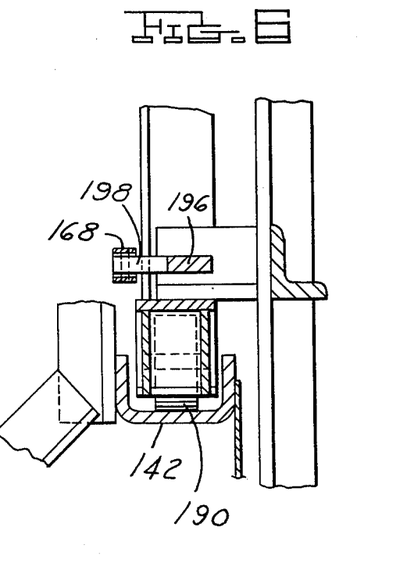
FIG. 6 is a fragmentary sectional view of the elevator lift mechanism, taken on the line 6—6 of FIG. 3.

The frame 20 includes a floor engaging base 116 of generally rectangular configuration. The base 116 is made from structural members forming a rectangular frame which rests upon the floor F. Struts 117 and braces 119 form part of the floor base 116 as shown in FIG. 4. At the corners of the rectangular frame or base 116 are upstanding structural corner posts or columns 118 of generally right angle configuration. Laterally extending cross braces or struts 120 are provided for connecting the corner post 118 and for providing support for the front panel 122 (FIG. 2) and for the side panels 124 (FIG. 12). The panels 122 and 124 are made from sheet metal and are secured to the framing structure by means of nuts and bolts. The panels 122 and 124 terminate adjacent the cross brace 126 and 128. Suitably supported on the cross braces 126, 128 is the expanded wire metal plate 130 (FIG. 1) upon which the operator stands.

A step ladder 132 and a protective hand rail structure 134 are provided. The step ladder 132 is mounted opposite the sheet metal panel 122 and permits the operator easy access to the operator station 28. The rail 134 is secured to the structural members of the main frame 20 for surrounding the operator plate 130 thereby preventing the operator from falling from station 28.

The interior of the operator station 28 or the area or zone 139 (FIG. 3) beneath the expanded metal plate 130 upon which the operator stands is used to house the lift mechanism or hydraulic piston and cylinder device 140 which functions to raise and lower the elevator 26 relative to the parcel loading station 24 as best shown in FIGS. 3, 4, 7, 8 and 13.

Figure 3:
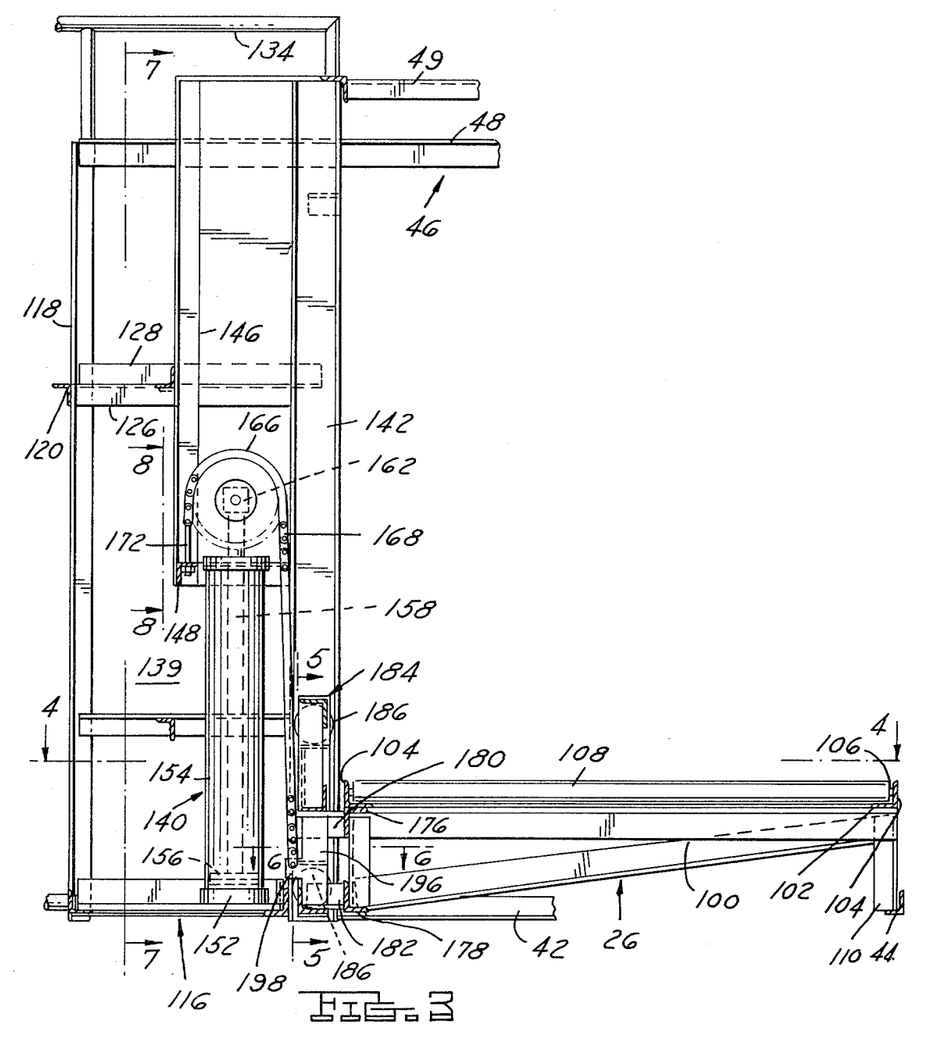
FIG. 3 is a fragmentary transverse sectional view taken along the line 3—3 of FIG. 2 and illustrating the elevator and lift mechanism for raising and lowering the elevator.
Figure 7:
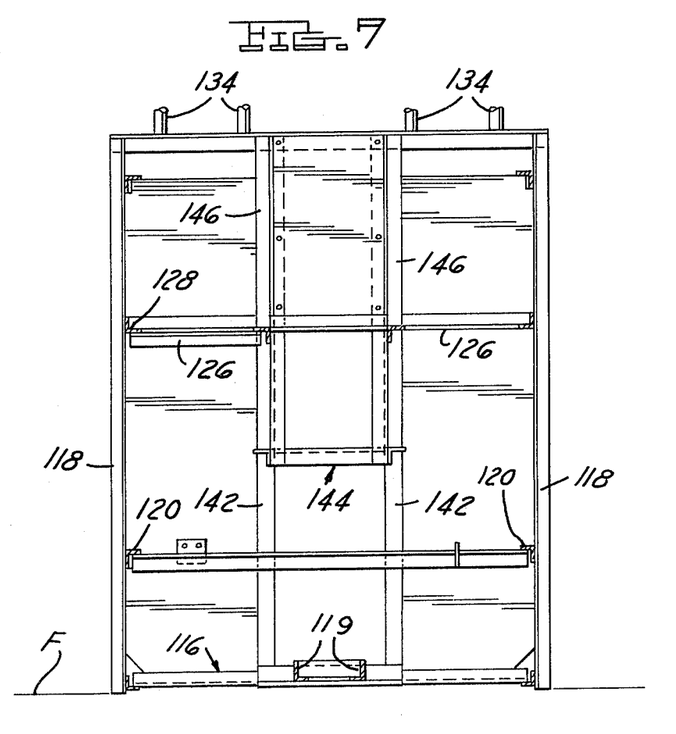
FIG. 7 is a vertical view, partly in section, of the interior of the operator support area of the palletizer, looking in the direction of arrows 7—7 of FIG. 3.

In between the vertical posts 118 as shown in FIGS. 4 and 7 are a pair of channel shaped vertical members 142 which extend from the floor F to an area above the track support 46 as noted in FIG. 3. Spaced from the channel members 142 is a frame 144 (FIG. 7) containing a pair of vertical members 146 and a cross brace or anchor support 148. The hydraulic piston and cylinder device 140 is mounted in the cylinder support structure 152 formed in part by the braces 119. The hydraulic device or motor 140 includes a cylinder 154, a piston 156 and a rod 158, with the rod 158 extending vertically upwardly as shown in FIGS. 3 and 8. The outer end of the rod 158 extends into an opening 160 provided in a transversely extending cylinder yoke 162 and is connected thereto. The outer ends 164 of yoke 162 are reduced in diameter. A pair of sprockets 166 are mounted upon the reduced end portions 164 of the yoke 162. Both ends 164 of the cylinder yoke 162 are tapped for zerk fittings. The sprockets 166 are held on the reduced end portions 164 by means of metal clips, not shown. A pair of elevator drive chains 168 are provided. One end 170 of each drive chain 168 is provided with a threaded anchor element 172 which is mounted upon and secured to the anchor support 148. Each chain 168 extends from the anchor support 148 across the sprocket 166 and down towards the floor F for engagement with the elevator mechanism 26 as illustrated in FIGS. 3, 4, 5, 6, and 13.

The back side or edge of the elevator 26 closest to the lift mechanism 40 includes as part of the elevator support structure a pair of upper and lower horizontally extending angle shaped structural members 176, 178 to which are secured upper and lower brackets 180, 182 respectively which operatively connect the elevator mechanism 26 to the drive chains 168. This is accomplished by a carriage assembly 184 comprised of a series of connected plates, angles and brackets for rotatably carrying and supporting a plurality of rollers 186 which engage and move along the side flanges 188 of the channel members 142 upon vertical movement of the carriage 184. Such carriage 184 further includes a series of rollers 190 which are movable along the webs 192 of the channel members 142. The carriage assembly 184 includes two pairs of angle brackets 194. Each pair supports a chain bracket 196 provided with a tab 198 (FIG. 3) to which the lower end of the corresponding chain 168 is connected. The lower ends of the drive chains 168 are connected to the carriage assembly 184 so that when the fluid motor or cylinder 140 is energized, the piston rod 158 moves upwardly as viewed in FIGS. 3 and 8, to thereby raise the sprockets 166 and in turn the chains 168 thus raising the elevator 26 as a result of the carriage assembly 184 moving along the vertical tracks 142.

The reversible subframe 34 forming the pallet storage station 36 as mentioned previously is adapted to be connected to either the left hand side or to the right hand side of the main frame 20. The subframe 34 has an elongated axis 200 which is perpendicular to the longitudinal axis 22 of main frame 20 as shown in FIG. 1. This is true regardless of whether the subframe 34 is located as shown in FIG. 1 or is reversed and is moved to the right hand side of the main frame 20 when viewed in FIG. 1.

Figure 9:
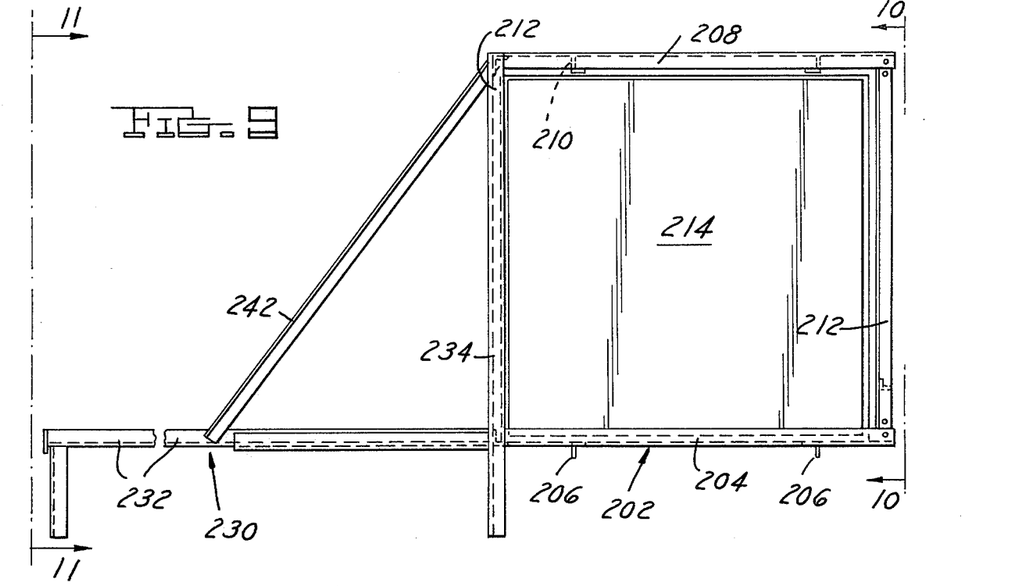
FIG. 9 is a front elevational view of the reversible subframe containing the pallet storage section of the palletizer.
Figure 10:
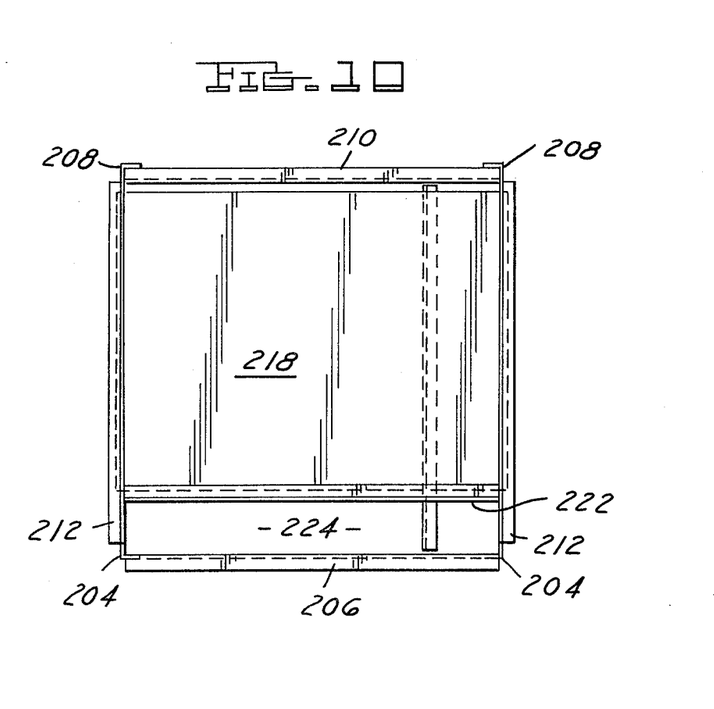
FIG. 10 is an end view of the subframe looking in the direction of arrows 10—10 of FIG. 9.
Figure 11:
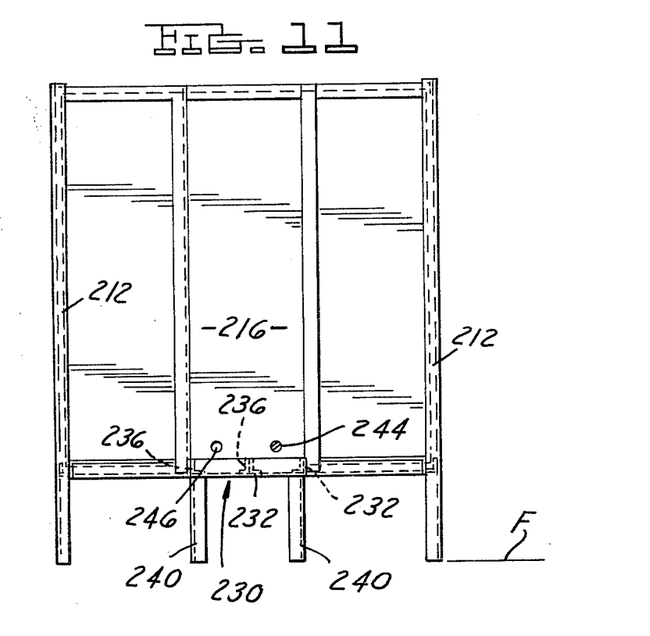
FIG. 11 is another end view of the subframe looking in the direction of arrows 11—11 of FIG. 9.

The subframe 34 consists of a generally rectangular support base or frame 202 which is elevated a foot or so above the floor F so as to align the support frame 202 thereof with the elevator 26 when in its lower position as in FIG. 3. The base 202 of the subframe 34 has a pair of right angle structural members 204 on opposite sides of the axis 200. Such members 204 are connected by at least a pair of right angle cross braces 206. Such a base 202 provides support for a series of pallets P as generally represented in FIG. 2. The subframe 34 further includes an open top frame consisting of right angle structural members 208, 210 overlying and spaced above the members of the base 202 of the subframe 34. A series of vertical posts or columns 212 connect the top and bottom frame members as shown in FIGS. 9, 10 and 11. The subframe 34 is provided with a generally rectangular panel 214 and a pair of generally rectangular side panels 216 and 218. The front side 220 is open when viewed in FIG. 2 to permit the pallets P to be stacked vertically at the pallet station 36. The panel 218 is located adjacent the elevator 26 and secured to the subframe 34. The bottom edge of panel 218 terminates at 222 (FIG. 10) to provide a slot or entrance 224 for the unloaded pallet P to enter the elevator 26.

The subframe 34 further includes a cylinder support structure 230 consisting of a first pair of parallel angle shaped members 232 forming a support for the cylinder 234 when the subframe 34 is at the left hand side of the palletizer 10. The support structure 230 further includes a pair of right angle elongated members 236 (FIG. 1) which provides a cradle or a support for the cylinder 234 when the subframe 34 is mounted on the right hand side of the palletizer 10. The cylinder support 230 is provided with a pair of legs 240 and a pair of braces or struts 242 for connecting the cylinder support 232 to the top frame support 208, 210 as shown in FIG. 9.

The plate or panel 216 which is located directly opposite from the cylinder 234 forms a dividing wall between the frame 20 and subframe 34 and is provided with a pair of rod openings 244 and 246 (FIG. 11). The cylinder 234 contains a piston 248 attached to an elongated rod 250 which extends out of the cylinder 234 and through the opening 244 for abutting the lower unloaded pallet P in the pallet storage station 36. When the subframe 34 is mounted on the right hand side of the palletizer 10, the cylinder 234 is carried by the other support elements 236 and the rod or ram 250 extends through hole 246 in the plate or panel 216.

Figure 18:
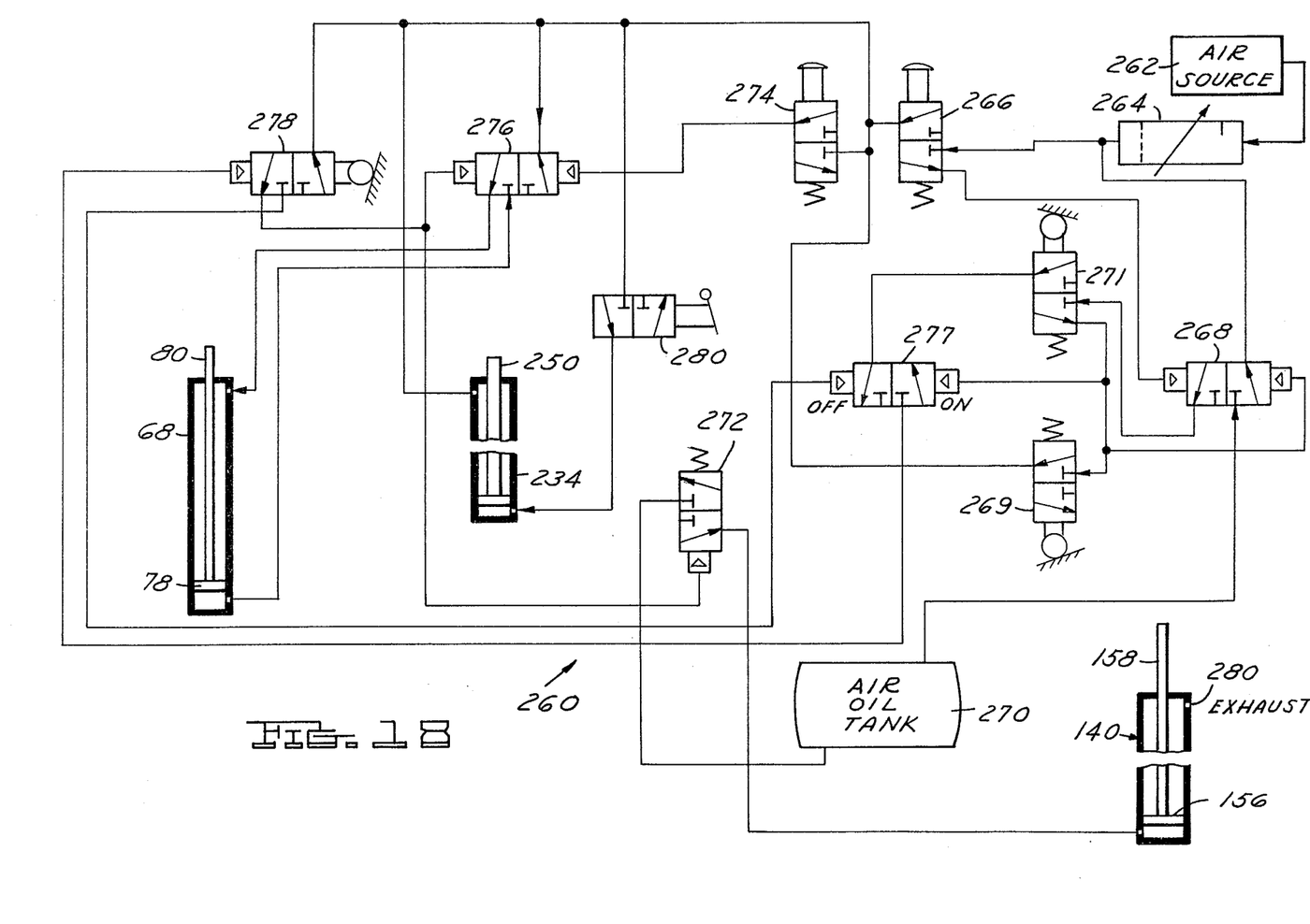
FIG. 18 is a schematic diagram of the hydraulicpneumatic circuit showing the valve and cylinder components employed for effecting semi-automatic operation of the palletizer.

The hydraulic-pneumatic circuit in FIG. 18 is designated by the number 260. The circuit 260 is attached to the air source 262 which contains air under pressure at, as an example, 130 psi. The air enters the circuit 260 through a conventional filter, regulator and lubricator assembly designated by the numeral 264.

The circuit 260 includes a manually operated valve 266 which when operated or pushed controls the flow of air through valve 268 to the air-over-oil tank 270. The air pressurizes the oil in tank 270 and directs same through the valve 272 to the elevator fluid motor or cylinder 140 to thereby extend or raise the rod 158 and to thereby raise the elevator 26 to the top or upper position near the parcel loading station 24. At the top position, the cylinder 140 contacts valve 269 which directs air to valve 268 and stops the cylinder 140 at its top position.

As a result thereof or when the operator actuates the manually operated valve 274, air is directed from source 262 through valve 268 and valve 271 to the cylinder 68 which controls the reciprocation of platen 82 from the retracted position to the extended position above the elevator 26. Valve 271 holds the platen 82 in the extended position. To withdraw the loaded platen 82 from the extended position, the operator manually shifts valve 274 to direct air to the rod end of cylinder 68 via the valve 276. This moves the platen 82 to the retracted position where it contacts valve 278 in the back position and directs air to valve 268 to lower the elevator cylinder 140 to the next level. Valve 277 is located between valve 271 and valve 278. Valve 271 is operated which prevents cylinder 140 from moving vertically downwardly. At the same time the platen 82 is moved to its extended position over the pallet on the elevator. A breather unit 280 is provided at the air exhaust end of cylinder 140.

The aforesaid procedure is repeated until the pallet on the elevator 26 is full loaded. Thereafter the operator shifts valve 282 which directs air from source 262 to the lower cylinder 234 which moves the rod or ram 250 against the lowermost one of the pallets P in the pallet storage station 36 into the elevator station while simultaneously displacing the loaded pallet and moving same to the discharge conveyor or station.

In addition to the circuit 260, a photocell 284 and a light source 286 are provided as noted in FIG. 12 in order to provide or to determine when the top layer of parcels 14 has descended vertically downwardly sufficiently to allow the platen 82 to be returned from the retracted position illustrated in FIG. 1 to the extended position where it overlies the loaded pallet on the elevator 26. The light beam from source 286 is interrupted when a layer of parcels 14 is dropped from the elevated platen 82 upon the withdrawal thereof. When the elevator 26 has lowered the top layer of the parcels 14 sufficiently, the photocell 284 is again illuminated. This causes the elevator 26 to stop and the elevated platen 82 to again extend itself over the pallet P. A new layer of parcels 14 may then be placed by the operator on the platen 82.

The general operation of the palletizer 10 is substantially as follows. Parcels 14 are supplied by the overhead conveyor 12 to the pallet loading station 24, with the platen 82 in its extended position underneath the adjustable frame. The operator standing on the platform 130 arranges the parcels 14 on the extended platen 82 in the desired pattern. While this is done, the elevator 26 positions a pallet P so that the upper surface thereof or the upper surface of the top layer on the pallet P is immediately below the platen 82. When a full layer is properly arranged on the platen 82, the operator actuates a control which operates the cylinder 68 to retract the platen 82, causing the layer of parcels 14 to drop or to be transferred onto the pallet P. As soon as this occurs, the elevator 26 automatically lowers so that the top fo the layer just deposited on the pallet P is located at a lever just below the platen 82. Such platen 82 is then moved from the retracted position to the extended position and another layer of parcels 14 arranged for loading thereon. This step or process is repeated until the pallet P is fully loaded and the elevator 26 is in its lower position as illustrated in FIG. 12.

When the pallet P is fully loaded, and the elevator 26 is in the lower position, such loaded pallet P is in alignment with an exit conveyor, not shown. The cylinder 234 is operated to push the bottom pallet P from the pallet storage section 36 through the slot 224 into engagement with the loaded pallet P as shown in FIGS. 16 and 17. Continued energization of the cylinder 234 moves the unloaded pallet P into the elevator section and simultaneously displaces the loaded pallet P onto the exit or discharge conveyor. Thereafter, continued movement of the cylinder 234 pushes the loaded pallet P along the elevator 26 ahead of the empty pallet P until finally the loaded pallet P is entirely exited from the elevator section. At such time the loaded pallet P on the discharge conveyor may be moved to storage or to a truck or carrier by a fork lift truck. Such operation has moved an unloaded pallet P onto the elevator 26. The ram 250 is then retracted a distance sufficient to clear the elevator 26. Thereafter the elevator 26 raises, vertically moving the empty pallet P to a position immediately below the extended platen 82 and the cycle is repeated until the pallet is loaded.

The particular controls for the palletizer are located adjacent the operator stand 130. Preferably the controls for valves 266, 274 and 280 are arranged so that the operation of the cylinders, valves and actuators are semi-automatically controlled and operate through the various cycles of operation when the operator actuates a control initiating a particular function. For example, the removal of a loaded pallet P and the position of an unloaded pallet P is initiated by a single action of the operator on machine by actuating the toggle valve 280. Similarly the retraction of the platen 82 to deposit an arranged layer of parcels 14 on a pallet P initiates automatic controls which causes the elevator 26 to lower the proper amount and the platen 82 to thereafter extend to receive a subsequent layer of parcels 14.

The physical effort required to load a pallet P is minimal and very little operator skill is required. Further, the output of the machine is high since all of the functions of the machine other than the arranging of the parcels 14 on the platen 82 are accomplished by power mechanisms,

I claim:

1. A palletizer for use in conjunction with a parcel feed mechanism comprising a main frame having an elongated axis, a first side and a second side paralleling said axis, said frame including at each of said sides alignment means for removably attaching a subframe, an elevated track structure carried by said frame, said structure including a pair of parallel and spaced apart tracks on opposite sides of said axis, a platen movably mounted on said tracks between an extended position and a retracted position, a first fluid operated motor carried by said frame and connected to said platen for moving same between said extended and retracted positions, said platen when in said extended position adapted to receive parcels from the parcel feed mechanism, a parcel receiving zone located under the extended position of said platen, elevator means for supporting a pallet relative to said parcel receiving zone for receiving successive layers of parcels as said platen is retracted by said first fluid motor, control means for vertically moving said elevator means between a lower position where it receives an empty pallet and from where a loaded pallet is discharged and a series of elevated positions where layers of parcels are received at said parcel receiving zone and deposited on a pallet or on the preceding layer of parcels, all supported by said elevator means, said control means stepping said elevator means vertically downwardly after a layer of parcels is deposited thereon until the loaded pallet reaches the lower position of said elevator means, a subframe removably connected to said alignment means at either the left hand side or the right hand side of said main frame, said subframe containing a pallet storage station located adjacent said elevator means for storing a plurality of vertically stacked empty pallets, said subframe having an axis perpendicular to the axis of said main frame, and a second fluid motor having an axis carried by said subframe, said second motor containing a ram which is adapted to engage the lower one of the empty pallets in the pallet storage station of said subframe and to move it against the loaded pallet at said lower station thereby displacing said loaded pallet from the elevator means and replacing same with an empty pallet, the axis of said second fluid motor being spaced from and parallel to the axis of said subframe.

2. A palletizer for use in conjunction with a parcel feed mechanism comprising a main frame having an elongated axis, a first side and a second side paralleling said axis, said frame including at each of said sides alignment means for removably attaching a subframe, an elevated track structure carried by said frame, said structure including a pair of parallel and spaced apart tracks on opposite sides of said axis, a platen movably mounted on said tracks between an extended position and a retracted position, a first fluid operated motor carried by said frame and connected to said platen for moving same between said extended and retracted positions, said platen when in said extended position adapted to receive parcels from the parcel feed mechanism, a parcel receiving zone located under the extended position of said platen, elevator means for supporting a pallet relative to said parcel receiving zone for receiving successive layers of parcels as said platen is retracted by said first fluid motor, control means for vertically moving said elevator means between a lower position where it receives an empty pallet and from where a loaded pallet is discharged and a series of elevated positions where layers of parcels are received at said parcel receiving zone and deposited on a pallet or on the preceding layer of parcels, all supported by said elevator means, said control means stepping said elevator means vertically downwardly after a layer of parcels is deposited thereon until the loaded pallet reaches the lower position of said elevator means, a subframe removably connected to said alignment means at either the left hand side or the right hand side of said main frame, said subframe containing a pallet storage station located adjacent said elevator means for storing a plurality of vertically stacked empty pallets, said subframe having an axis perpendicular to the axis of said main frame, a second fluid motor carried by said subframe, said second motor containing a ram which is adapted to engage the lower one of the empty pallets in the pallet storage station of said subframe and to move it against the loaded pallet at said lower station thereby displacing said loaded pallet from the elevator means and replacing same with an empty pallet, a dividing wall is provided between said main frame and said subframe separating said pallet storage section and said elevator means, said wall containing an opening through which a single empty pallet may be inserted onto said elevator means, and said subframe having a second wall opposite to said dividing wall, said second wall containing a pair of openings, said ram being adapted to extend through one of said openings into said pallet storage station, the opening selected depending upon whether the subframe is secured to the right hand side or to the left hand side of the main frame.

3. The palletizer of claim 2 wherein said dividing wall and said second wall are parallel and a third wall secured to said subframe and arranged perpendicular to said dividing wall and to said second wall, said walls enclosing said pallet storage station on three of its four sides, with the fourth side being open to permit the insertion of stacked pallets.

4. A palletizer for use in conjunction with a parcel feed mechanism comprising a main frame having an elongated axis, a first side and a second side paralleling said axis, said frame including at each of said sides alignment means for removably attaching a subframe, an elevated track structure carried by said frame, said structure including a pair of parallel and spaced apart tracks on opposite sides of said axis, a platen movably mounted on said tracks between an extended position and a retracted position, a first fluid operated motor carried by said frame and connected to said platen for moving same between said extended and retracted positions, said platen when in said extended position adapted to receive parcels from the parcel feed mechanism, a parcel receiving zone located under the extended position of said platen, elevator means for supporting a pallet relative to said parcel receiving zone for receiving successive layers of parcels as said platen is retracted by said first fluid motor, control means for vertically moving said elevator means between a lower position where it receives an empty pallet and from where a loaded pallet is discharged and a series of elevated positions where layers of parcels are received at said parcel receiving zone and deposited on a pallet or on the preceding layer of parcels, all supported by said elevator means, said control means stepping said elevator means vertically downwardly after a layer of parcels is deposited thereon until the loaded pallet reaches the lower position of said elevator means, a subframe removably connected to said alignment means at either the left hand side or the right hand side of said main frame, said subframe containing a pallet storage station located adjacent said elevator means for storing a plurality of vertically stacked empty pallets, said subframe having an axis perpendicular to the axis of said main frame, and a second fluid motor carried by said subframe, said second motor containing a ram which is adapted to engage the lower one of the empty pallets in the pallet storage station of said subframe and to move it against the loaded pallet at said lower station thereby displacing said loaded pallet from the elevator means and replacing same with an empty pallet, said second fluid motor being in the form of a pneumatic cylinder containing a piston and rod assembly, said subframe containing a saddle for supporting said cylinder, said saddle being divided into two zones, said cylinder occupying one of said zones depending on which side of said main frame said subframe is connected.

5. The palletizer of claim 4 wherein a dividing wall is provided between said main frame and said subframe separating said pallet storage section and said elevator means, said wall containing an opening through which a single empty pallet may be inserted onto said elevator means.

6. The palletizer of claim 4 wherein said first fluid motor is in the form of a pneumatic cylinder and a piston and rod assembly, said rod being attached to a bracket provided on the bottom side of said platen, said cylinder and piston and rod assembly having the same axis as said main frame.

7. The palletizer of claim 6 in which said tracks each have a pair of intersecting side flanges facing upwardly, said platen being provided with rollers at the side edges thereof, said rollers each having an annular groove with tapered side surfaces engageable with the side flanges of said tracks.

8. The palletizer of claim 4 including an operator station raised above ground level and located adjacent said parcel loading station, a step ladder mounted at one end of said frame for providing access to said operator station, and a protective rail mounted on said frame for preventing a person from falling from said operator station.

9. The palletizer of claim 4 wherein said control means includes a hydraulic lift device located within said main frame adjacent to said elevator means, said lift device including a vertically movable rod, a yoke carried by said rod, a pair of sprockets mounted on the ends of said yoke, drive chains on said sprockets, one end of each of said chains being fixed to said frame, a pair of guide channels, a roller carriage movable in said guide channels upon the energization of said lift device, means connecting said carriage to said elevator means, and means securing the other ends of said chains to said roller carriage whereby as said rod is extended said chains and said roller carriage are raised thereby raising said elevator means.

10. The palletizer of claim 9 wherein said elevator means includes a platform provided with a plurality of rollers upon which the pallet rests.

11. The palletizer of claim 4 wherein an adjustable frame is provided above said parcel loading zone for sizing the outer periphery of the layer of panels, said platen being movable underneath said adjustable frame when in its extended position.

* * * * *